Oct. 14, 1969  J. P. VERCOUTEREN  3,471,887
MILK CAN SCRUBBER

Filed July 3, 1967  4 Sheets-Sheet 3

Inventor
James P. Vercouteren
By
Wheele, Wheeler, House & Clemency
Attorneys

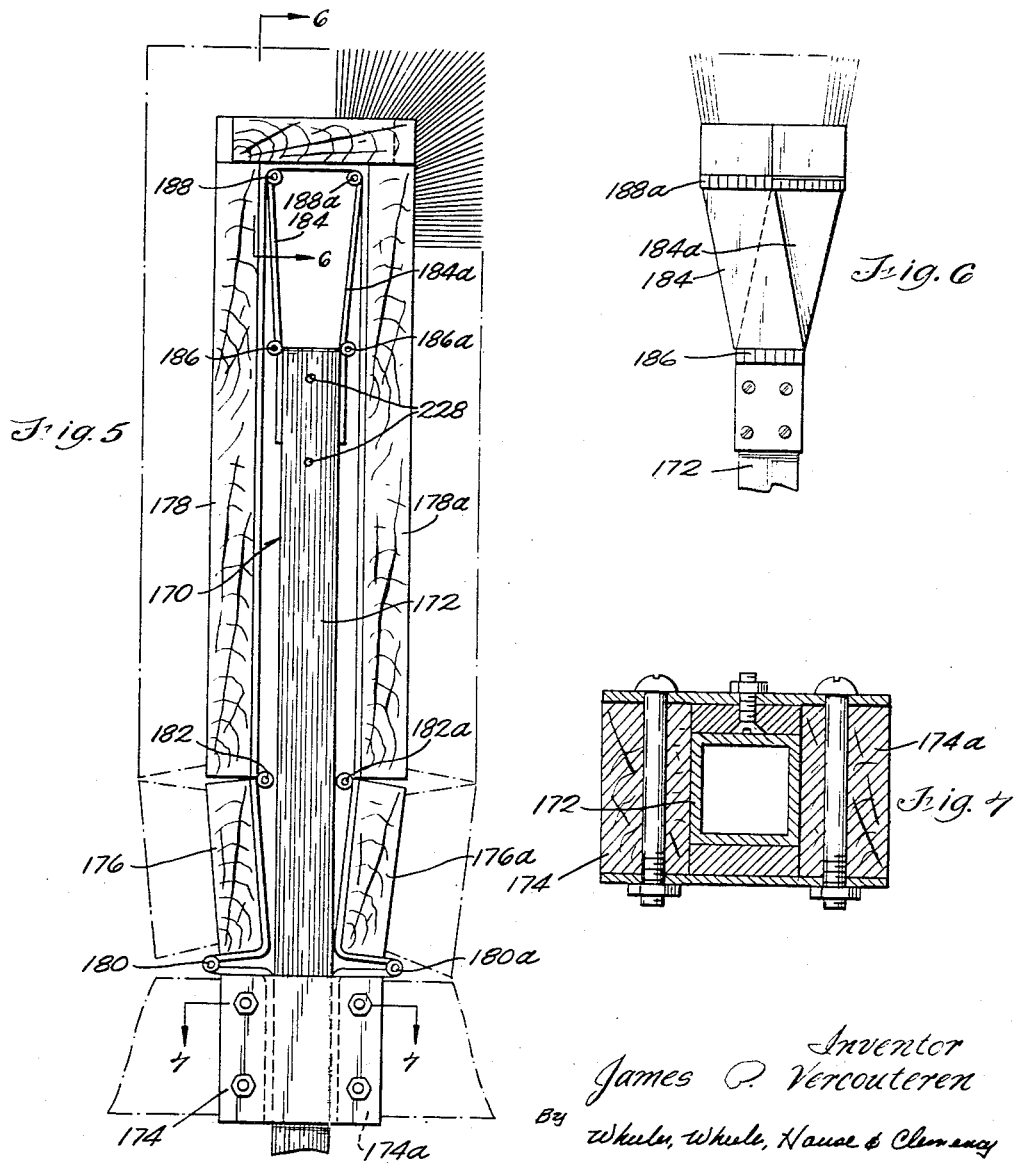

United States Patent Office 3,471,887
Patented Oct. 14, 1969

3,471,887
MILK CAN SCRUBBER
James P. Vercouteren, 2314 Erie Ave.,
Sheboygan, Wis. 53081
Filed July 3, 1967, Ser. No. 651,037
Int. Cl. B67c 1/08; A47l 15/00
U.S. Cl. 15—72                                10 Claims

ABSTRACT OF THE DISCLOSURE

An automated can scrubbing device for milk cans through which cans are advanced step by step on a track with each can being simultaneously scrubbed outside and inside while being sprayed with a cleaning solution at one station along the track.

Background of the invention

In the dairy industry milk can sanitation is a serious problem because of the speed with which milk is degraded when exposed to various organisms and the difficulty with which all traces of milk are removed from a milk container in order to prevent the growth of the organisms. Mere sterilization of a milk can is not sufficient unless the milk residues are completely removed, along with any traces of rust, in order to provide a hostile environment for micro-organisms. So far as I am aware there is no milk can scrubber which has proven satisfactory for commercial use which in addition to washing the can thoroughly scrubs it with a mechanical brushing action covering the entire outside wall, inside wall and inside bottom, and which performs this action automatically with a high rate of production. I have perfected such a device and in actual tests it has substantially reduced the rejection of milk cans as unfit during inspections by the health authorities. Both milk stone and rust are removed from the cans by my device, and the cans remain cleaner than cans handled by prior methods even when they are brought back to the dairy filled at a later date, due to the thoroughness with which contamination is removed. My device is preferably used as an addition to a conventional can washing device and may share a common conveyor with the can washer so that every can coming to the dairy is scrubbed before it is washed.

Summary of the invention

My device includes a conventional milk can conveyor which advances cans in an intermittent motion by means of a forwardly moving can advancing stroke and a rearwardly moving stroke during which the cans are stationary, the cans passing along a rail or rails in an inverted position. A pair of switches are used to control the timing of the device, one said switch being activated by the conveyor as it reaches a rearward position in its travel and the other said switch being at the can scrubbing station and activated by a can as it reaches the switch. Upon arrival of a can at the can scrubbing station a group of exterior scrubbing brushes are swung into can scrubbing position and are rotated at varying speeds while an interior can scrubbing brush rises through the neck of the can and expands to scrub all surfaces of the interior in a direction counter to the rotation of the exterior scrubbing brushes. Sprays of cleaning solution are directed at the exterior and interior of the can during the scrubbing operation. Upon arrival of the conveyor at the rearward position ready to advance another can, the exterior scrubbing brushes are moved to a position free of the conveyor tract and the interior scrub brush is retracted downwardly and collapsed to pass through the neck of the can to a position below the conveyor to permit another can to advance to the scrubbing station.

Drawings

FIG. 4 is a fragmentary cross-sectional view on line 4—4 of FIG. 3, showing the mechanism of the driving and elevating carriage for the interior scrub brush, but showing the carriage in a lower position than that illustrated in FIG. 3.

FIG. 5 is a view of the interior scrub brush which is enlarged with respect to the showing in FIG. 3 and which shows the position of the components of the brush when the carriage which drives and elevates it is in its lowered position.

FIG. 6 is a cross-sectional view on lines 6—6 of FIG. 5 showing details of the structure of the interior scrub brush.

FIG. 7 is a view on line 7—7 of FIG. 5 showing further details of the structure of the interior scrub brush.

Description

Figure 1:
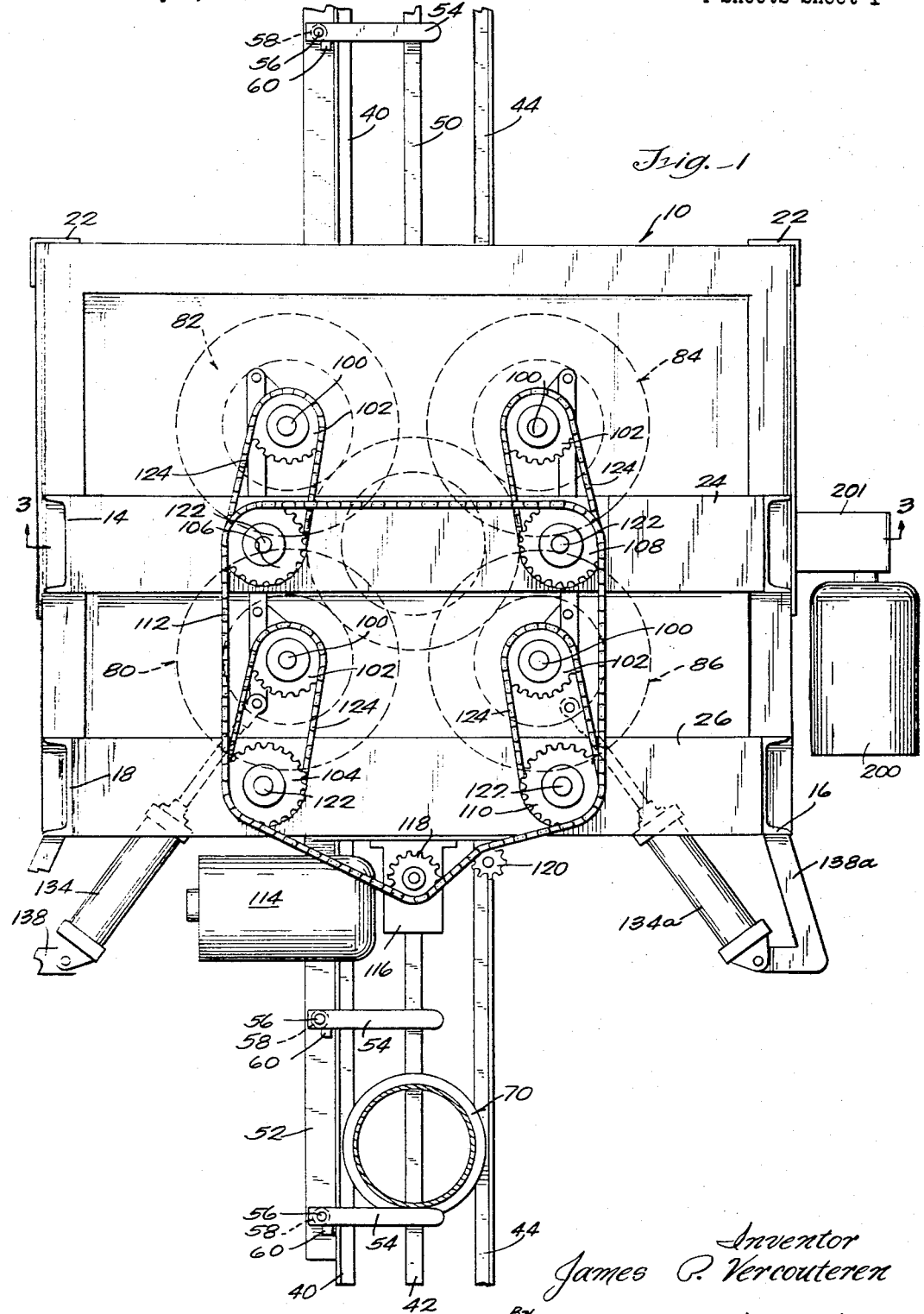
FIG. 1 is a top view of the can scrubbing device of my invention.

As shown in FIG. 1, the milk can scrubber of my invention is enclosed within a housing generally designated as 10. Side frame members 12 and 14, heavy corner members 16 and 18 in the front corners of housing 10 and light rearward corner members 20 and 22 in the rear of the frame support the unit vertically. A center beam 24 and a front beam 26 support major components of the scrubbing system from the side and corner frame members.

The track for the milk cans consists of a number of stationary rails 40, 42, and 44 upon which the mouth of the can rests as it passes through the machine. Central rail 42 ends at a lateral rail section 46 which underlies the trailing edge of the can mouth when the can is at the scrubbing station. A second lateral rail 48 supports the leading edge of the can mouth at the scrubbing station, while the side margins of the can mouth are supported by rails 40 and 44, the four rails 40, 44, 46 and 48 thus defining the scrubbing station and in particular defining a support for the can having an open center for the passage of the brushes which scrub the interior of the can. Rail 50 continues the center rail rearwardly from rail 48.

The conveyor further consists of a longitudinal bar 52 having can advancing arms 54 which are pivoted at 56 and are biased by springs 58 against the respective stops 60 positioned on bar 52 in such a location as to permit the bar to swing parallel with bar 52 when bar 52 is moving in an advancing direction, the bar 54 being pushed aside by a can 70 against the bias of spring 58 as the bar 52 moves forwardly. When bar 52 is moving in a direction to advance the cans 70 toward the rear of the scrubbing machine, or toward the top in FIG. 1, the stop 60 prevents each bar 54 from being deflected by a can 70 and accordingly can 70 is pushed by bar 54 to advance the can through the machine until the bar 52 reaches the rearward end of its stroke, whereupon bar 52 again reverses direction, the various paddles 54 are deflected by a can 70 behind the can 70 which they had been advancing, bars 54 are then returned to their laterally extending position as shown in FIG. 1 by springs 58, and upon an advancing stroke of bar 52 each bar 54 advances a can 70 again. Thus cans 70 advance intermittently on the advancing stroke of bar 52, and stand upon the tracks during the retracting stroke of bar 52. The proportions of the stroke and the location of the housing 10 with respect to the advance of bars 54 with a single stroke of bar 52 are chosen to bring a can to rest supported by bars 46 and 48 at the scrubbing station.

Figure 2:
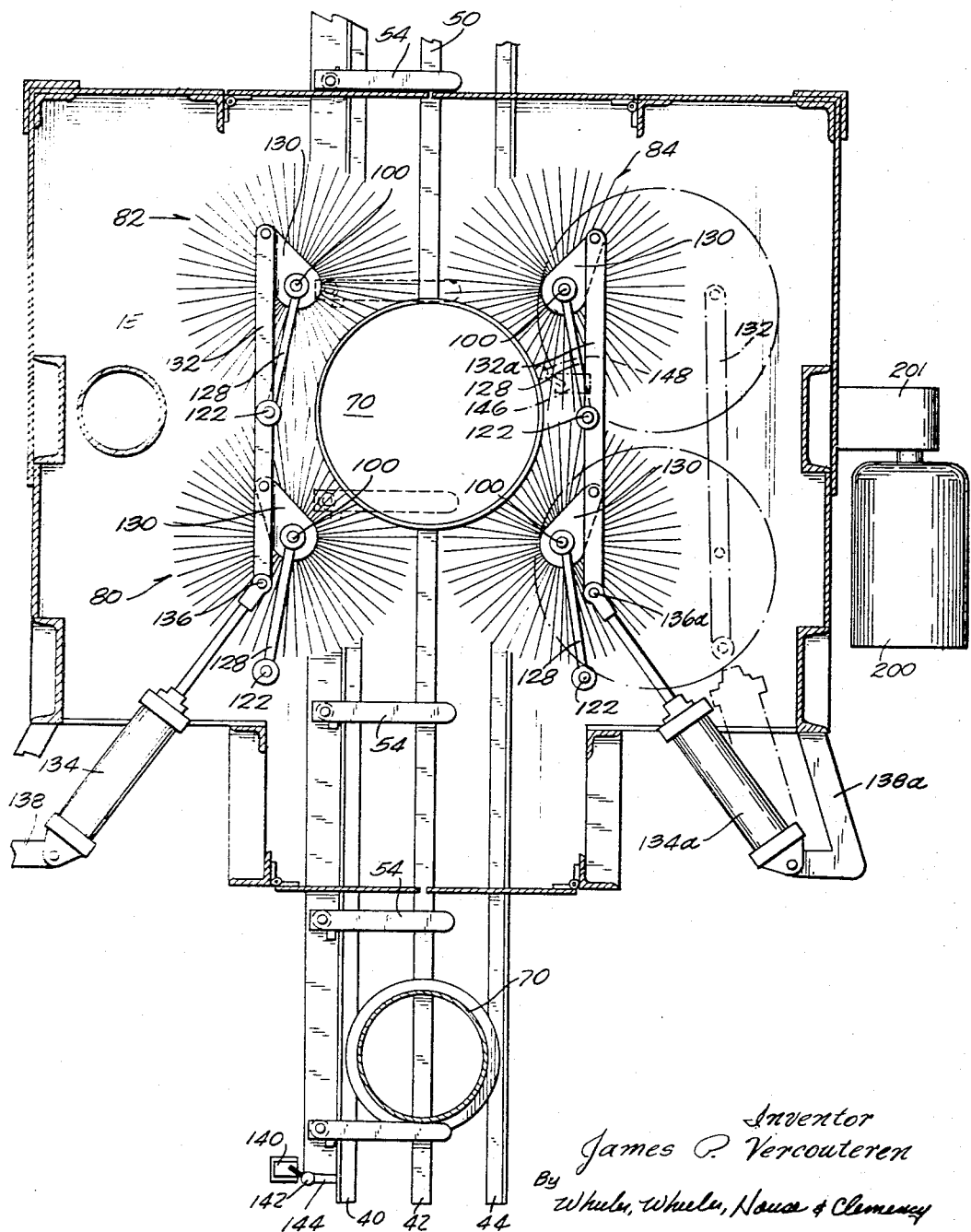
FIG. 2 is a cross-sectional view on line 2—2 of FIG. 3, showing the linkages which move the outer brushes to and from the scrubbing position, the scrubbing position being shown in full lines and the retracted position being shown in broken lines at the right side of the figure.
Figure 3:
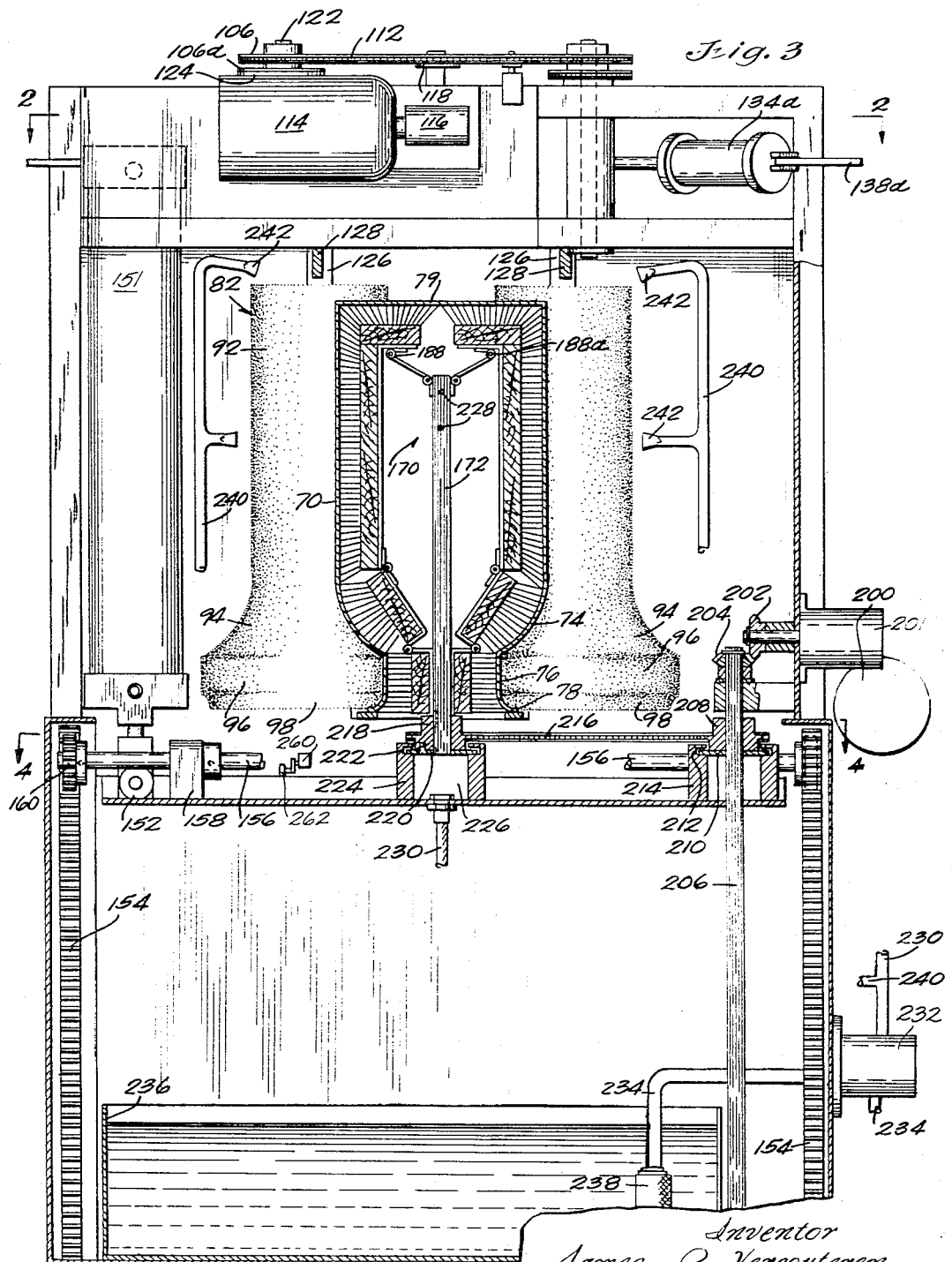
FIG. 3 is a cross-sectional view on line 3—3 of FIG. 1, showing a can at the scrubbing station.

The general plan of the mechanism for scrubbing the exterior of cans 70 is shown in FIGS. 1 and 2, FIG. 1 showing the drive mechanism while FIG. 2 shows the support mechanism in more detail. As best shown in FIG. 2, there are four exterior scrubbing brushes 80, 82, 84 and 86. The exterior shape of the brushes is best shown in FIG. 3. Each brush 80–86 is contoured to be complementary to the exterior side of can 70, having a straight side 92 corresponding to the straight cylindrical wall 72 of the can, a concave conical portion 94 corresponding to the convex shoulder 74 of the can, a larger diameter cylindrical portion 96 corresponding to the neck 76 of the can and a reversed conical section 98 corresponding to the flared mouth 78 of the can.

The can is also provided with a bottom 79 and an optional feature of my device is a scrubber (not shown) which may descend on bottom 79 to scrub it while other scrubbers are scrubbing the remaining portions of the can. Whether or not the bottom is scrubbed it will be contacted by the cleaning solution which is sprayed within the housing 10.

Brushes 82–86 are each fixed on a rotatable vertical shaft 100. As best shown in FIG. 1 each shaft 100 carries a sprocket 102 at its upper end.

Each sprocket 102 is driven by a common drive system which includes a motor 114, a gear reducer 116, and an output sprocket 118, driving a master drive chain 112 which is maintained at the proper tension by a chain tightener sprocket 120 in a well-known manner. The drive chain 112 extends around a circuit including sprocket 104 which is associated with brush 80, sprocket 106 which is associated with brush 82, sprocket 108 which is associated with brush 84, and sprocket 110 which is associated with brush 86. The four sprockets 104–110 each have a different number of teeth, so each rotates at a different speed. Each of the four drives an intermediate vertical shaft 122, or jackshaft, which is provided with a second sprocket designated respectively 104a, 106a, 108a and 110a. Each of the latter sprockets drives a chain 124, and each chain 124 extends around one of the sprockets 102 which are fixed on shaft 110 and which therefore drive the four brushes 80–86. The drive to each brush is at a different speed by reason of the difference in the sizes of sprockets 104–110.

Each of the shafts 100 which carry the outside scrub brushes is carried in a bearing 126, which in turn is carried on a link 128, and each link 128 is pivotally mounted on a shaft 122, so that each brush 80–86 is swingable about the axis of a shaft 122 through which power is supplied to the brush. Thus even though the brushes swing, the chain drive maintains a constant length.

Swinging of the exterior brushes is accomplished by four arms 130 each of which is rigid with a link 128 but extends laterally at an angle to the link which is away from the longitudinal center of the device as represented by the conveyor. In effect, 130 is a part of link 128 angled from its main axis. A brush position control bar 132 is pivotally attached to the ends of the two links 130 on the left side of the machine and a similar control bar 132a is attached to the ends of the links 130 on the right side of the machine. Control bars 132 and 132a are each oscillatable from a position in which the brushes controlled by the bar are against the can or other container 70, to a position in which the brushes are retracted from the path of container 70, as best shown in FIG. 2. Any conventional means may be used to oscillate the arms. In the preferred form this means takes the form of a pair of cylinders 134 and 134a for the right and left control bars 132 and 132a, which are respectively pivoted at 136 and 136a to the respective control bars, and which are pivotally mounted to respective supports 138 and 138a carried on the frame of the machine. A single circuit actuates cylinders 134 and 134a for simultaneous application and return. The term cylinder is intended to be generic and to include any fluid operated cylinder, whether the fluid is liquid or gaseous. In many cases air will be the preferred medium because a supply of compressed air is already on hand or readily available. Control of the cycle of operation of cylinders 134 and 134a is by means of switch 140 having a control arm 142 which is actuated by a cam 144 on the longitudinal conveyor bar 52, and by switch 146 having an actuating arm 148 which is actuated by a container 70 when it reaches proper position in the scrubbing station 46–48.

An inner brush 170 is supported on a carriage 150 which is moved up and down by a pressure cylinder 151 (or other means) connected to carriage 150 at 152. If a single cylinder 151 is used, carriage 150 is kept horizontal during the raising and lowering motion, despite the use of only a single cylinder 151, by means of a pair of racks 154 at each side of carriage 150, each of racks 154 having teeth on both sides. A pair of shafts 156 are mounted in bearings 158 near each end of each shaft. The bearings which are secured to carriage 150 as shown in FIGS. 3 and 4. Each shaft 156 carries a pinion 160 at each end which is securely fixed to the shaft. As a result, when anchorage 152, which is secured to carriage 150, is lifted by cylinder 151, the pinions 160 at that end of the carriage are pulled upwardly along rack 154 causing them to rotate. Since the pinions 160 at the other end of each shaft 156 are also secured to the shaft they too are forced to rotate and lift the other end of carriage 150.

Inner brush 170 is composed of a central shaft 172, which as shown in FIG. 7 is preferably rectilinear and hollow. As best shown in FIG. 3, a series of brush sections is provided at each side of shaft 172. These comprise neck and mouth scrubbing sections 174 and 174a, interior shoulder scrubbing sections 176 and 176a and side and bottom scrubing sections 178 and 178a, the latter sections each being L-shaped to scrub substantially the entire cylindrical portion of the side of can 70 and one-half of the inner bottom 79 of can 70. Sections 174 and 174a are attached to shaft 172 as shown in FIG. 7, and are secured to brush section 176 and 176a respectively by means of hinges 180 and 180a. Sections 176 and 176a are respectively hinged at 182 and 182a to respective sections 178 and 178a but are not secured to shaft 172. A pair of links 184 and 184a are hinged to shaft 172 by means of hinges 186 and 186a and are hinged to brush sections 178 and 178a by means of respective hinges 188 and 188a. The brush is collapsed by downward movement of shaft 172 transmitted to the lowest brush segments and is expanded by centrifugal force upon rotation of shaft 172 and by upward movement of shaft 172 which pushes the brush segments outward.

Internal brush 170 is driven by a motor 200 whose speed may be adjusted with an appropriate gear reducer 201, and which drives bevel gears 202 and 204, gear 204 being secured to a square vertical shaft 206. Shaft 206 drives a sprocket 208, but is vertically slidable through the square opening in the hub of the sprocket. Sprocket 208 is supported in vertically and horizontally fixed but rotatable connection with carriage 150 by means of a plate 210 which is fixed to the hub of the sprocket and which has its edges received in an annular groove 212 in a fixed mounting 214 on carriage 150. A chain 216 transmits power from sprocket and hub 208 to sprocket and hub 218, which is similarly fixed with respect to the carriage by means of a plate 220 having its edges engaged in an annular groove 222 in a fixed mounting 224 on carriage 150. This mounting permits hub 218 to rotate without changing its vertical or horizontal position with respect to carriage 150.

Shaft 172 is fixed in hub 218, and has a central longitudinal passage extending its full length and in open communication with the cavity 226 within mounting 224 for the purpose of supplying washing fluid to the interior of the can as it is being scrubbed. Openings 228 (for example) are provided at the upper end of shaft 172 of the inner brush and at various other locations as needed. The exact location of the openings is not critical as long as washing solution is supplied to the entire interior of the container in sufficient volume to accomplish effective cleansing in conjunction with the action of interior brush 170. Thus the location and form shown for openings 228 is illustrative merely.

Fluid is supplied to cavity 226 below the post 172 of internal brush 170 by a conventional flexible hose 230 or the like connected at one end to the base 224 in such a manner as to communicate with internal cavity 226 and connected at the other end to a pump 232. The pump receives fluid cleaning solution from an inlet duct 234 which terminates near the bottom of a reservoir 236 in a filter screen 238. Other portions of conduit 230 and conduit 234 are conventional and are not shown in detail. A branch 240 of outlet conduit 230 from pump 232 supplies fluid to a plurality of spray heads 242 to supply cleaning fluid to the outside of can 70 and rotating brushes 80–86.

Rotation of brush 170 causes it to expand, interfering with the raising of the brush. The operation of motor 200, pump 232, and of motor 114, for the outer brushes is accordingly initiated by a separate switch 260 having an actuator 262 in the path of carriage 150. The position of the actuator is such that switch 260 is not actuated until raising of the carriage 150 is complete or well advanced.

Operation

Having described the mechanical parts of my device, the manner in which it operates will now be described.

Milk cans 70 are loaded onto conveyor rails 40–44 in each space between conveyors bars 54 or as often as cans are presented for scrubbing. In the preferred embodiment the cans are already on the conveyor bars as they leave a can rinsing machine and continue on through my can scrubbing machine propelled by the same conveyor as described above. A can washer may follow my device. As conveyor bar 52 oscillates forwardly and rearwardly a can on conveyor tracks 40–44 is pushed forward a distance roughly equal to the distance between lateral conveyor bars 54 with each forward and rearward cycle of longitudinal conveyor bar 52. One such advance terminates at the scrubbing zone outlined by bars 46 and 48 of the conveyor which define a space having no central can support rail, to permit the inner can scrubbing brush 170 to rise into the inverted can. As the can 170 arrives at the scrubbing station it trips switch 146 by hitting actuating member 148. Switch 146 is so connected that the cycle is initiated when the switch is tripped. Cylinders 151, 134 and 134a are actuated by switch 146. Cylinders 134 and 134a push the outer brush control bars rearwardly and toward the longitudinal center line of my device to bring the four external brushes against the side of the container 70 which is in the scrubbing station. Cylinder 151 lifts the carriage 150 with the internal brush folded, as shown in FIG. 5, into the can through the downwardly facing mouth. Switch 260 then starts brush motors 114 and 200 and pump 232. As brush 170 begins to rotate it opens out to the position shown in FIG. 3 in which all portions of the interior of can 70 are scrubbed. At the same time cleaning solution is applied to the exterior of the can from any suitable spraying device shown here illustratively as a spray head 242, and is supplied to the inside through the shaft 172 of the interior brush 170 and out of spraying devices, shown here illustratively as holes 228.

Since the outer brushes are all rotating in the same direction they impart a rotation to the can 70. However, since each external brush is rotating at a different speed and the internal brush is counter-rotating, the speed of the can will be no more than the average of the speeds of the brushes and it is usually less than the speed of the slowest outer brush. Consequently all of the external brushes have relative rotation with respect to the surface of the can in order to scrub it.

During the scrubbing cycle the longitudinal bar 52 of the conveyor is retracting toward the front of the machine, and when it reaches a sufficiently advanced position it trips switch 140 by means of a cam 144 secured to longitudinal conveyor bar 52 which strikes switch actuator 142 at a precisely timed position. Tripping of switch 140 stops brush motors 200 and 114 and pump 232, reverses the supply of fluid pressure to cylinders 134 and 134a, causing them to move the brush control bars to the right and left sides respectively and swinging the exterior brushes away from can 70 to clear the conveyor. At the same time, cylinder 151 lowers carriage 150 carrying the internal brush 170, either by a release of pressure in cylinder 151 permitting the carriage to move downwardly under the influence of gravity, or by reversing cylinder 151 to positively lower carriage 150. All brushes are retracted and at rest as the can 70 which has just been scrubbed is advanced by a conveyor bar 54 sufficiently to clear the external scrub brushes 82 and 84 on their next scrubbing cycle and a new can 70 is moved into position at the scrubbing station 46–48. It will be noted that if the conveyor line is not full, a condition which is depicted in FIG. 1, switch 146 will be actuated only at the intervals when a can 70 arrives at scrubbing station 46–48, so that there is no scrubbing cycle unless there is a can to be scrubbed, despite the continued operation of conveyor bar 52. The exact electrical circuit is not shown because other circuits having the same functions are possible, including the use of fluid valves for some functions, particularly switch 146.

Thus I have provided a new and unusually efficient means of removing milk residues, rust, or the like, from milk cans or other containers, greatly improving the sanitation standards of the milk cans which are periodically brought to a dairy using my device by farmers, and suitable for other uses. My device may be used between a rinsing device and a washing device, with a common conveyor, if desired.

I claim:

1. In a container washing machine, the combination of a conveyor adapted to convey a container in an upright inverted position in a generally horizontal path to a container scrubbing station, means for conveying the container away from the scrubbing station in a generally horizontal path subsequent to washing, and means for spraying the container inside and outside with a solution for washing the container at the scrubbing station, and the improvement comprising a plurality of external container scrubbing brushes, means to rotate said brushes, and means to oscillate all of said brushes from a position engaging the exterior of a container at the container scrubbing station to a position removed from said container, an internal can scrubbing brush mounted for rotation and carried upon means for elevating said internal brush through the opening of said container into container scrubbing position and for lowering said interior brush into an inactive position free of said container, and automatic means to sequentially actuate the means to oscillate said external brushes and actuate the means to elevate said internal brushes into container scrubbing position, to rotate said brushes, and to move said brushes to an inactive position free of said container in timed relation to the movement of containers along said conveyor.

2. The device of claim 1 in which said automatic means to move said external and internal brushes from inactive position to container scrubbing position includes means sensitive to the location of a container at said container scrubbing station.

3. The device of claim 1 in which said automatic means to initiate rotation of the internal and external brushes includes means responsive to positioning of the internal brush in container brushing position.

4. The device of claim 3 in which the conveyor moves the containers intermittently and said automatic means includes means on said conveyor to terminate rotation of said internal and external brushes and to move said internal and external brushes to inactive position just prior to the initiation of an intermittent movement of a container.

5. The device of claim 4 in which said conveyor comprises a series of rails to support the mouth of a container, a longitudinal bar oscillating cyclically alongside said rails from an advanced position to a retracted position, and container advancing members pivoted to said bar, said container advancing members being constrained to occupy a position at right angles to said bar upon engagement with a container during an advancing stroke of said bar and being free to pivot forwardly during a retracting stroke of said bar, and said automatic means further comprising a cam member secured to said bar, a switch having an actuator, said actuator lying in the path of said cam at a point when the retracting motion of said bar is nearing completion, and means responsive to the actuation of said switch to oscillate the external brushes and lower the internal brushes and stop the rotation of said brushes.

6. The device of claim 1 in which the external brushes revolve in a common direction and the internal brush revolves in the opposite direction.

7. The device of claim 1 in which the external brushes revolve at different speeds.

8. The device of claim 1 in which the means to oscillate the external brushes further comprises an intermediate driven shaft for each said brush, a link having a free end and an end pivoted on said intermediate shaft for swinging movement of the free end toward and away from said container scrubbing station in a horizontal plane, each said external brush being provided with a central shaft rotatably mounted on the free swinging end of said link, and means for simultaneously swinging all of said links toward said container washing station when a container is located at said station and for swinging said links away from said container washing station when said conveyor removes a container from said station.

9. The device of claim 8 in which said means for swinging said links comprises a control bar pivotally secured to each said link at one side of the center line of said conveyor and a motor pivotally connected to said control arm and adapted to oscillate said control bar toward and away from the center line of said conveyor.

10. The device of claim 1 in which said internal brush is rotatably mounted on a vertically movable carriage, said carriage being provided with a pair of parallel shafts extending horizontally of said carriage, each shaft carrying a gear at each end, a fixed vertical rack engaging each gear on each shaft, and a motor adapted to move said carriage vertically.

References Cited

UNITED STATES PATENTS

| 1,791,603 | 2/1931 | Rennie | 15—70 |
| 1,960,530 | 5/1934 | Doering et al. | 15—70 |

WILLIAM I. PRICE, Primary Examiner

R. I. SMITH, Assistant Examiner